United States Patent [19]
Wilhelm

[11] Patent Number: 5,158,712
[45] Date of Patent: Oct. 27, 1992

[54] MULTILAYER ANGULAR PACKING

[75] Inventor: Gerd Wilhelm, Neuss, Fed. Rep. of Germany

[73] Assignee: Sulzer Brothers Limited, Winterthur, Switzerland

[21] Appl. No.: 582,977

[22] PCT Filed: Feb. 9, 1990

[86] PCT No.: PCT/CH90/00026
§ 371 Date: Sep. 28, 1990
§ 102(e) Date: Sep. 28, 1990

[87] PCT Pub. No.: WO90/10497
PCT Pub. Date: Sep. 20, 1990

[30] Foreign Application Priority Data
Mar. 9, 1989 [DE] Fed. Rep. of Germany ....... 3907573

[51] Int. Cl.$^5$ .................................... B01F 3/04
[52] U.S. Cl. .................... 261/79.2; 261/DIG. 72; 261/94
[58] Field of Search ............ 261/79.2, DIG. 72, 94

[56] References Cited

U.S. PATENT DOCUMENTS

| | | | |
|---|---|---|---|
| 3,010,706 | 11/1961 | McWilliams | 261/DIG. 72 |
| 3,295,840 | 1/1967 | Donald | 261/DIG. 72 |
| 4,022,596 | 5/1977 | Pedersen | 261/DIG. 72 |
| 4,107,241 | 8/1978 | Braun | 261/79.2 |
| 4,497,753 | 2/1985 | Streiff | 261/DIG. 72 |
| 4,501,707 | 2/1985 | Buhlmann | 261/94 |
| 4,830,792 | 5/1989 | Wilhelm | 261/DIG. 72 |

FOREIGN PATENT DOCUMENTS 1292816 2/1987 U.S.S.R. .................... 261/DIG. 72

OTHER PUBLICATIONS

WO86/06296, Nov. 1986, Wilhelm, 261.

Primary Examiner—Tim Miles
Attorney, Agent, or Firm—Francis C. Hand

[57] ABSTRACT

A regular economically producible packing of use in chemical engineering equipment is described. Physicochemical phenomena in thermal separating and mixing apparatuses in particular are associated with contacts between different phases in cocurrent and countercurrent operation. The important feature of an appropriate packing design is to intensify transverse mixing in the flowing phases and to intensify contact between them. This purpose is served in the packing according to the invention not only by known fan-like vane elements but also by a number of channels rows which are parallel to one another and offset from one another, the effect of such rows being to boost transverse mixing and phase contact of the flowing media, more particularly when the lighter phase flows at elevated speed.

6 Claims, 5 Drawing Sheets

MULTILAYER ANGULAR PACKING

The invention relates to regular packings used as furniture elements in thermal separating facilities, for example, in rectification, extraction and sorption and also in mixing technology.

The invention relates more particularly to packings of this kind in which uniform fan-like vane elements are distributed over their physical dimensions. Elements of this kind are disclosed in DE-OS 3 515 300 A1 corresponding to U.S. Pat. No. 4,830,792 and PCT W086/06296. Elements of this kind are of use in column apparatuses and channels to enhance cross-distribution and cross-mixing of the flowing phases which contact one another in chemical and thermal separating and mixing processes. The advantageous use of so-called angle packings containing the fan-like vane elements referred to leads, for example, in thermal separation technology, to a greater dissociative effect in mass transfer processes than can be provided by other packings.

However, it is precisely as regards the separating efficiency of angle packings that the sequence in which fan-like vane elements are disposed in a packing is important. The packing structure defined with reference to FIGS. 5–7 of DE-OS 3 515 300 A1 provides helical paths for phase subflows, with the possibility of adjacent subflows of the same phase rotating to opposite hands. The packing described in the latter publication is highly effective at separation. However, production and assembly costs of such a packing are greater than for other comparable products since it seems very likely that the packing can be built up only in layers layered perpendicularly to the main flow axis. Other kinds of packing, for example, those produced by the Sulzer company and the Montz company, described by R. Billet in Energieeinsparung bei thermischen Stofftrennverfahren, ISBN 3-7785-0912-8 use zig-zag folded sheets, known as pleated mats, which can be introduced into columns with their axes parallel as furniture elements, the fold edges of the sheet metal parts used for the packing usually being askew of the column axis. As regards the packing described in both the publications DE-OS 3 515 300 A1 and PCT W086/06926 with fan-like vane elements, versions are described in which the packing can be built up on a basis of pleated mats.

Reference should be made on this point more particularly to the embodiment illustrated in FIG. 12 of the PCT application W086/06296. As compared with the packing shown in FIGS. 5 to 7 of DE-OS 3 515 300 A1, the zig-zag folding of the sheet metal parts leads to straight triangular channels which are formed with lateral orifices but which form preferred straight flow paths more particularly for the lighter phase—i.e., as a rule for vapor or gas. In this embodiment, the fan-like vane elements act predominantly on the descending flow of liquid phase whose flow velocity as referred to the free column cross-section is much below that of the lighter phase.

The advantage of lower-cost packing production in the case of the embodiment of FIG. 12 of PCT application W086/06296 is offset by a disadvantage, viz. that as the gas or vapor loading increases there is an increased flow of the lighter phase through the straight channels, with a reduction of the required cross-mixing more particularly in the vapor or gas.

The flush channels formed by the pleatings provide for a gas or vapor flow in the case of a packing block preferred directions which could be projected, for example, in the form of parallel straight lines on a cross-sectional plane of the flow channel or of the column surrounding the packing. From the point of view of adequate cross-mixing in the lighter phase, however, a uniform distribution of the velocity components over the projection cross-section would be desirable.

To obviate this disadvantage arising from simplified packing production, the problem is to find—while retaining fan-like vane elements which have proved very effective at least for the uniform distribution of descending liquid over the cross-section—a packing structure which can also be produced economically from edged sheet metal parts—i.e., from so-called pleated mats—but which impart to the throughflowing vapor or gas more than a single preferred direction detectable in the cross-section projection and thus enhance transverse mixing in the gas phase.

Briefly, the invention provides a packing which is comprised of a plurality of parallel layers each of which has a plurality of regular fan-like vane elements. These regular fan-like vane elements are formed above a plane square grid of equilateral pyramids whose side surfaces are alternately open and closed and two such pyramids are so raised above each element of the grid one on either side thereof that the two closed side surfaces which are disposed on the ground side of a grid element and which belong to different pyramids form a plane surface. Layers which are thus structured are so placed one on another with their pyramid apexes contacting one another that the surfaces converging at the pyramid apexes do not form planes with one another.

In one embodiment, the vane elements are rhomboid shaped so that one half forms a closed side of a pyramid projecting from one side of the layer while the other half forms a closed side of a pyramid projecting from the opposite side of the layer.

In another embodiment, each vane element at the top and bottom of a packing is of triangular shape. In this case, the layers at the top and bottom of the packing are stacked so that the pyramids are in apex-to-apex relation.

These and other objects and advantages of the invention will become more apparent from the following detailed description taken in conjunction with the accompanying drawings wherein.

Figure 1:
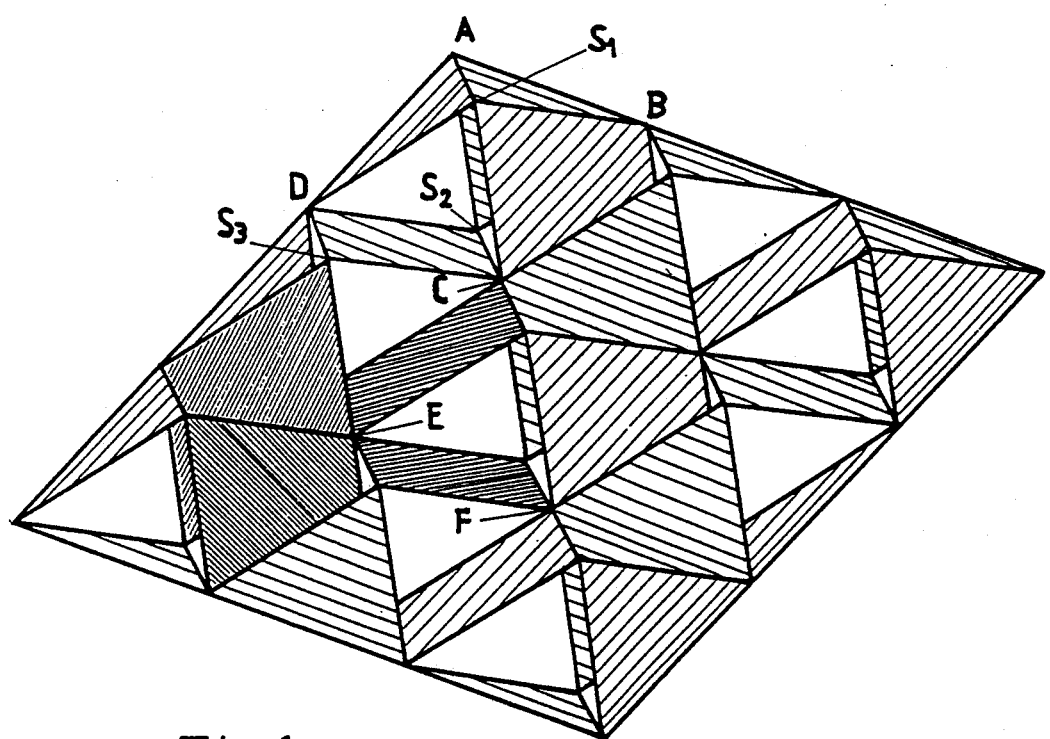
FIG. 1 illustrates a packing layer formed of rhumboid shaped vane elements in accordance with the invention.

FIG. 1 shows the basic structure of the packing. Points A, B, C, D are corners of a square grid element. The pyramids of apex $S_1$ have closed side surfaces $ADS_1$, and $CBS_1$. Pyramid apex $S_2$ is disposed vertically below $S_1$; side surfaces $ABS_2$ and $CDS_2$ form part of the pyramid having the apex $S_2$. The surface $CDS_2$ joins the side surface $DCS_3$ belonging to the upwardly directed adjacent pyramid of apex $S_3$. The two pyramids' sides together form a plane surface, viz. A rhomboid $DS_3CS_2$. A point E is the center of a stationary fan-like vane formed by four rhombic surfaces and emphasized by closed hatching in FIG. 1.

A stationary fan vane can be made out around each bottom point in the structure of FIG. 1. The fan vane associated with bottom point F is associated with the opposite direction of rotation as compared with the fan vane based on the bottom point E.

Figure 2:
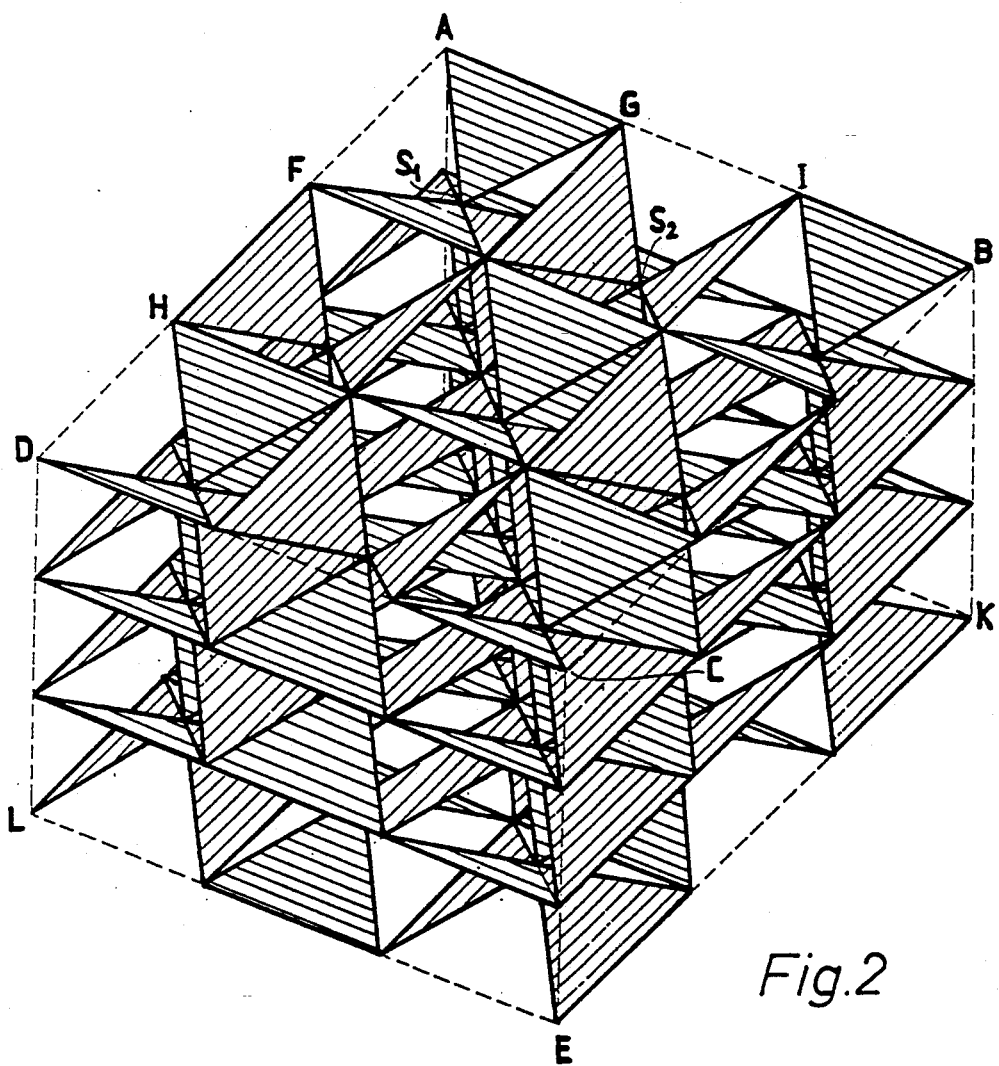
FIG. 2 illustrates a perspective view of a packing formed of layers illustrated in FIG. 1 in accordance with the invention.

FIG. 2 shows a packing block or unit comprising layers of the kind shown in FIG. 1 and are placed one on another. Each of the top and bottom layers of FIG. 2 comprises half a layer of the kind shown in FIG. 1, the section being through the grid plane. The references $S_1$ and $S_2$ each denote by way of example in FIG. 2 two abutting pyramid apexes. The packing unit cross-section in FIG. 2, as defined by the corners A, B, C, D, has in its vertical projection a density produced by two half-layers of the kind shown in FIG. 1.

The packing construction of FIG. 2 is noteworthy in two respects. First, the packing can be combined not only from layers, as just described, but also from pleated mats. The point is that if the packing is imagined to be severed along the cross-section diagonal AC vertically towards E, parallel cuts to the severance cuts made to left and to right through the points F, G, H and I lead to sheet metal parts which have zig-zag edges and rhombic cut-outs. Thus, for instance, a pleated mat produced by such parallel cuts through the points A and F in FIG. 2 presents to the vapor flow, although in only partly covered triangular channels, a straight alignment which extends parallel to the section planes and upwards from the back to the front. Correspondingly the alignment of the vapor flow in the mat defined by parallel sections through A and G is also parallel to the cut surfaces; however, because of the edging of the triangular channels, the flow direction is now mainly upwards from the front (approximately at the point E) to the rear (substantially to the point A). Second, a further lane formation, not initially apparent from FIG. 2, is present for the vapor flow and extends transversely to the section surface previously discussed through the points A, C, E in FIG. 2—i.e., parallel to a vertical section through the plane at the points D, B, K, L, for if the unit of FIG. 2 is turned through 90° to the left around its vertical central axis, the lane formation extending parallel to the rectangular section plane BKLD becomes apparent.

Figure 3:
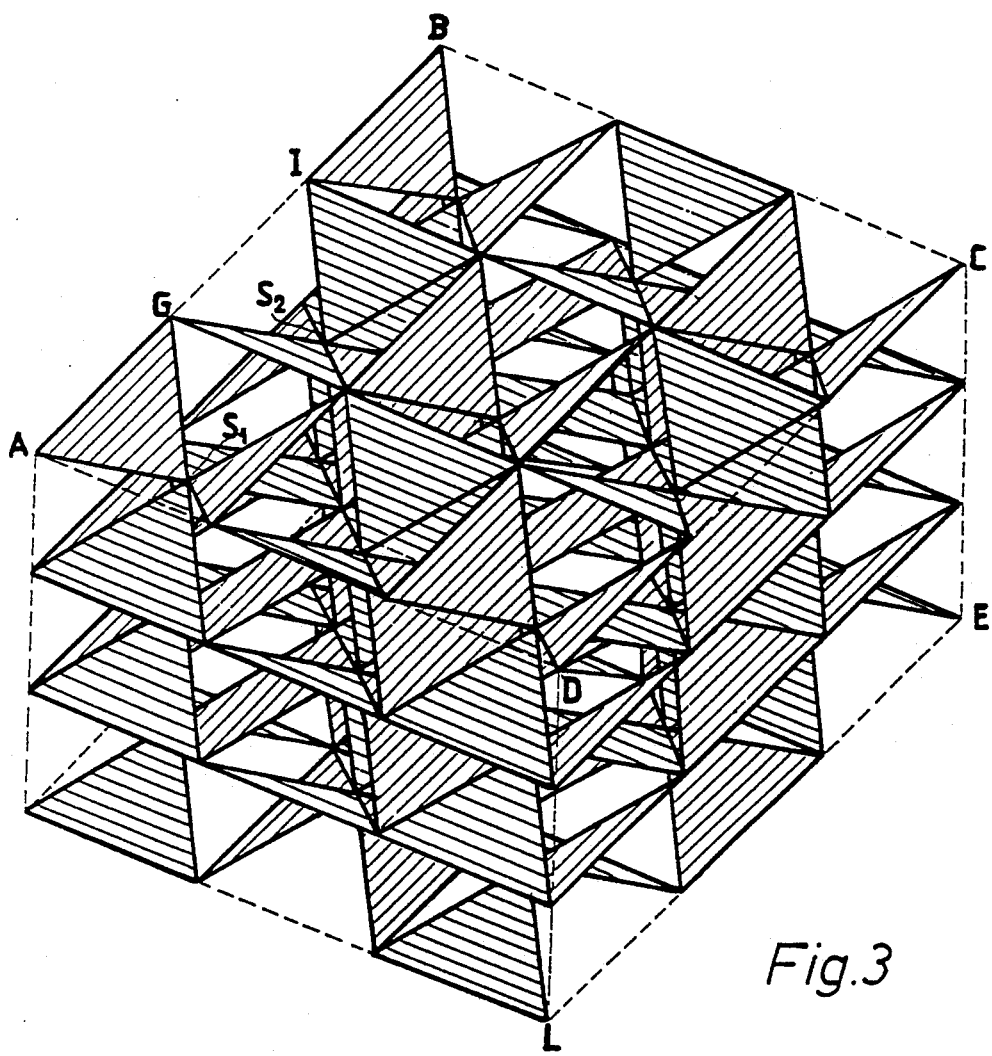
FIG. 3 illustrates a view of the packing of FIG. 2 turned 90°.

FIG. 3 shows the packing which has been turned through 90° and in which the points denoted by letters in FIG. 2 have retained their references. Because of the 90° rotation mentioned the point B, for example, moves from its position in FIG. 2 to a position in FIG. 3 which was the position of the point A in FIG. 2. Similar considerations apply to the rotation of the other points in FIG. 2 and, therefore, to the relationship between FIGS. 2 and 3. Lanes for the phases to flow through now also become apparent in FIG. 3 parallel to the vertical section through the points B, D, L just as in FIG. 2.

In fact, therefore, a packing unit according to the invention as shown in FIGS. 2 and 3 has offset channel rows—i.e., rows parallel to the section surface through the points B, D, L and rows which are offset from the latter rows and which extend parallel to such surface through the points A, C, E (FIGS. 2 and 3). The required increased transverse mixing in the lighter-phase flow is therefore achieved.

An interesting feature from the production engineering point of view is that the unit shown in FIGS. 2 and 3 can be constructed in two ways—i.e., by pleated mats which can be layered one on another either parallel to the section plane containing the points A, C, E or parallel to the section plane containing the points B, D, L (FIGS. 2 and 3).

The packing unit is shown in both FIGS. 2 and 3 in an ideal form which would be difficult to produce since the ends of the pyramid surfaces have only a dot-like contact with one another. To make the packing more stable in its practical form, overlaps can be provided at the contact places of the pyramid surfaces.

Figure 4:
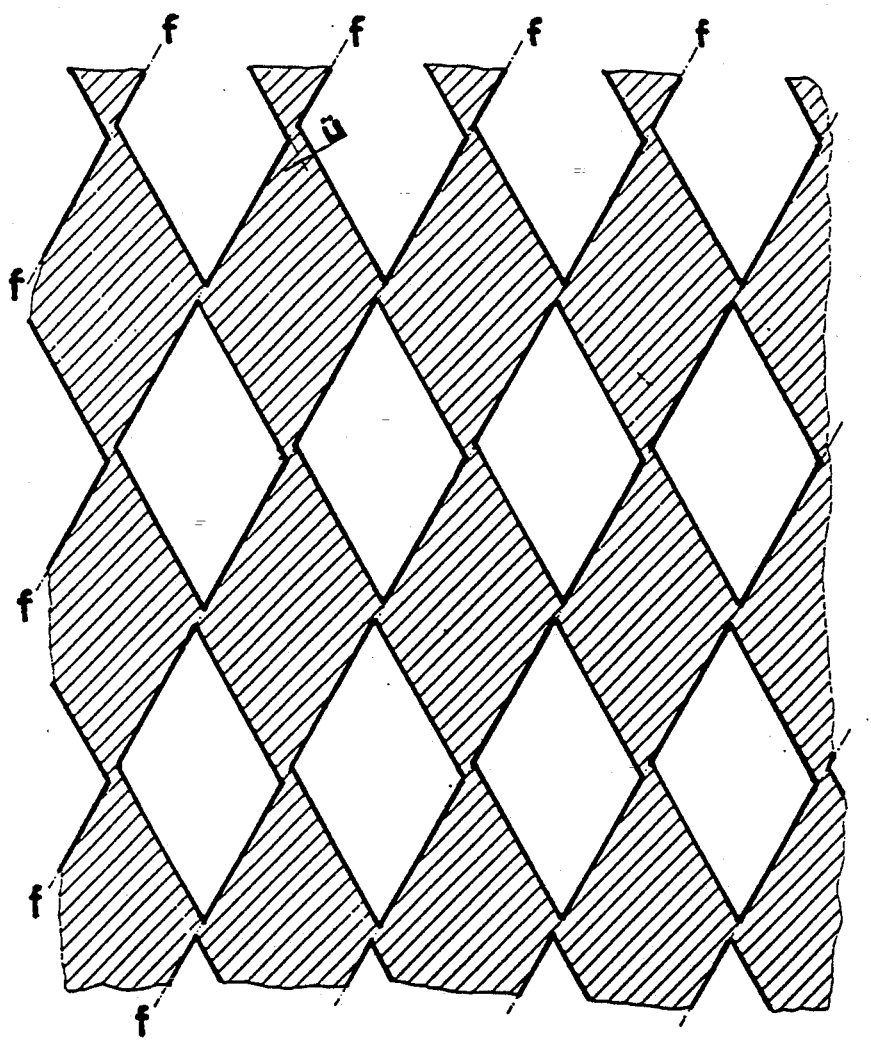
FIG. 4 illustrates a view of a sheet metal panel from which a packing layer of FIG. 1 can be formed in accordance with the invention.

FIG. 4 shows a sheet metal panel or the like from which rhombic cut-outs have been made in the unhatched parts. The stability of the mat prepared from the panel is provided by overlaps ü in FIG. 4. The zig-zag mat shape is produced by edgings along the chain-dotted lines f—f.

Figure 5:
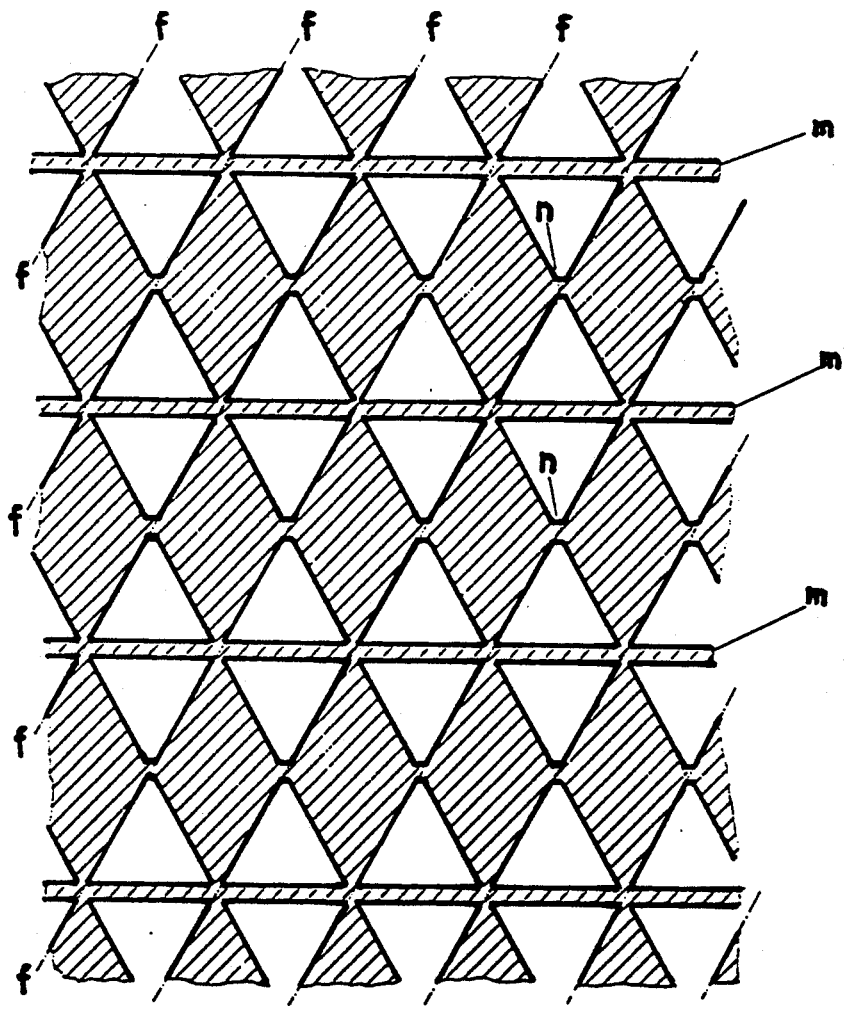
FIG. 5 illustrates a pleatable sheet metal panel for forming a packing layer in accordance with the invention.

FIG. 5 shows another form of a pleatable sheet-metal panel according to the invention. The chain-dotted straight lines f—f again denote the pleating edges. The basically rhombic cut-outs are flattened at the pointed corners by short webs n and have further webs n extending through them. This feature also helps to provide the packing with the necessary stability.

The packing according to the invention comprises, in addition to the triangular channels previously mentioned each permitting a velocity component of the flows along the column axis, two offset channel rows which extend parallel to the cross-sectional plane of the column. The large number of differently directed channel rows—i.e., the "multiplicity" of the packing—boosts transverse mixing in addition to the existing vane elements, more particularly in the lighter phase. In countercurrent operation, for example, with liquid and vapour in countercurrent, the maximum loading measured by reference to the maximum possible vapor speed is considerably higher than that of other packings in otherwise comparable conditions.

To further improve phase distribution over the column cross-section the packing surface can be impressed with transverse grooves or formed with apertures. The same purpose is served by making the packing of a woven metal or textile fabric.

Other materials, such as plastics and ceramics, as well as metals and textiles can be considered for the packing according to the invention for other reasons, for example, cost or corrosion.

I claim:
1. A packing comprising
   a plurality of parallel horizontal layers, each said layer having a plurality of interconnected rhomboid shaped vane elements defining a plurality of upraised equilateral pyramids on each side of said layer, each said pyramid having a pair of closed sides defined by a pair of said rhomboid shaped vane elements, a pair of opposite open sides and an apex defined by said sides;
   each layer being disposed with an adjacent layer with said pyramids thereof disposed in apex-to-apex relation and with said rhomboid-shaped vane elements of each layer being disposed in non-planar relation with each contiguous rhomboid-shaped vane element of an adjacent layer to obviate straight vertical flow paths through said packing.

2. A packing as set forth in claim 1 wherein each pyramid on one side of a respective layer has an apex aligned with an apex of a pyramid on an opposite side of said respective layer, said aligned apices being disposed on a common axis perpendicular to the plane of said respective layer.

3. A packing as set forth in claim 1 wherein each layer is of rectangular shape.

4. A packing comprising
a plurality of vertically disposed sheet metal panels, each panel having rows and columns of interconnected rhomboid-shaped elements, said elements of each row being folded relative to each other in a zig-zag manner, and said elements of each column being twisted relative to each other whereby said elements in each column are disposed in non-planar relation with an adjacent element in each respective column.

5. A sheet metal panel having a plurality of rhombic-cut-outs to define rows and columns of interconnected rhomboid-shaped elements, said elements of each row being folded relative to each other in a zig-zag manner, and said elements of each column being twisted relative to each other whereby said elements in each column are disposed in non-planar relation with an adjacent element in each respective column.

6. A sheet metal panel as set forth in claim 5 having continuous webs, each web extending between two rows of said elements in interconnected relation.

* * * * *